Figure 1:
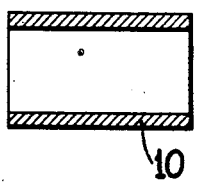

June 30, 1931.    C. L. EKSERGIAN    1,811,996
METHOD OF MAKING HUBS
Filed June 4, 1929

INVENTOR.
CAROLUS L. EKSERGIAN.
BY
ATTORNEY.

Patented June 30, 1931

1,811,996

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING HUBS

Application filed June 4, 1929. Serial No. 368,350.

It is the aim of this invention to utilize preformed tubing to form a large part of the completed hub. This is to the end of cutting down the amount of machining necessary on the hub, economizing on material and labor.

The method consists in forming flanged tubular parts, in abutting relation and securing the flanges of parts together to form the root of a radially extending hub flange, with the parts in axial alignment, and in commonly flash welding to the peripheries of the flanges a ring of metal of sufficient thickness to complete the radius of the hub flange desired.

Figure 3:
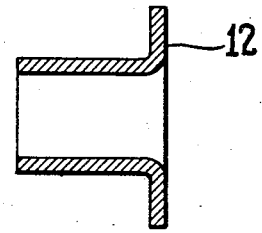
Figure 2:
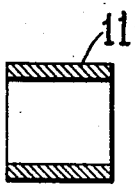
Figure 4:
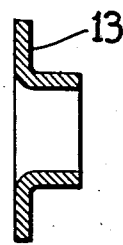
Figure 5:
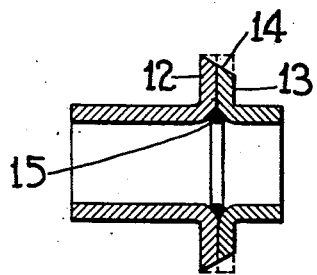
Figure 6:
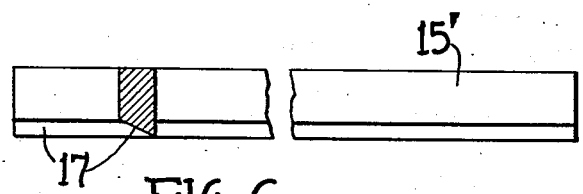
Figure 7:
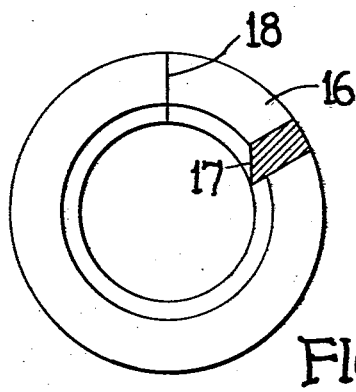
Figure 8:
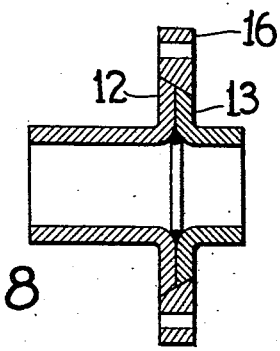

Referring to the drawings,

Figure 1 shows in axial section, a long section of tubing for the forming of one flanged part, Figure 2 a somewhat shorter section of tubing for the forming of the other flanged parts, Figures 3 and 4 show the two sections of tubing flanged at their ends, Figure 5 shows them placed in axial alignment with the flanges abutted and secured together, Figure 6 shows flat strip stock from which a ring is to be formed, Figure 7 shows the ring so formed and Figure 8 is an axial cross section of the completed hub formed by the welding of the ring to the flanges of the assembled parts of Fig. 5.

The sections of tubing 10 and 11 of Figs. 1 and 2 are cut from long lengths of tubing of appropriate wall thickness and internal and external diameter. The wall thicknesses are chosen not only with respect to the ultimate wall thickness of the hub parts of the barrel desired, but also with respect to the ultimate thickness of the roots of the flanges to be formed on the barrel. Expanding the ends of tubes to flange them results in a thinning of the tube walls. This is taken into account.

Flanges 12 and 13 are formed on the respective tubes. They extend radially to a height constituting not only the roots of the radial ultimate flanges of the completed product of Fig. 8, but further to constitute a substantial part in the main body of the ultimate radial flange, so great a part of the main body that the annular ring, which is to surmount them and to complete the flange, may be of relatively small thickness. These flanges I bevel on their peripheries as at 14 to constitute an axial seat for the ring which is to surmount them.

The flanges 12 and 13 of the sections are then abutted as shown in Fig. 5 and arc welded as shown at 15 on the interior, to secure them together. The machining at 14 may be and preferably is done after the arc welding operation. This arc welding is done in a rotary arc welding machine.

Strip 15' of Fig. 6 is preferably substantially of the radial cross section of the ultimate ring 16 of the completed product shown in Fig. 8. It, therefore, already carries a bevel 17 complemental to the bevel 14 of the periphery of the flanges 12 and 13. It is cut into lengths sufficient to form the ring of proper periphery bent into the form shown in Fig. 7 and the abutting ends butt welded together as indicated at 18. The bevel 17 is machined or otherwise treated to render it appropriate for flash welding with the complemental surface 14.

It is then flash welded under axial relative movement to the preassembled parts of Fig. 5 to produce the completed article of Fig. 8, the welding taking place uniformly over the complemental surfaces 14—17. Through this welding flanges 12 and 13 are peripherally secured together.

Obviously there is no waste of material whatever by this process excepting such slight amounts as may be required for proper machining. There is no waste in cutting lengths of tubing and expanding the ends of the tubing, there is no waste in cutting rings from strip stock. This strip stock is relatively small in section, the ring 16 being relatively thin, since the roots of main bodies of the ultimate radial hub of the flanges are constituted by the flanges 12 and 13 expanded from the tubing.

What I claim as new and useful and desire to protect by Letters Patent is:—

1. The method of making hubs which consists in separately flanging a pair of tubular sections, abutting the flanges, and joining the flanges together by butt welding commonly to them a ring of material.

2. The method of forming hubs which consists in forming flanged tubular sections, abutting and securing together the flanges with the sections in axial alignment, and radially extending the flanges to form a hub flange by butt welding an annular ring to the periphery thereof.

3. The method of forming hubs which consists in forming end flanges on tubular sections, abutting the flanges, beveling their peripheries, and butt welding an interiorly beveled ring to the beveled periphery of the flanges.

4. The method of making hubs which consists in forming end flanges on tubular sections, abutting and interiorly arc welding together the flanges of a pair of sections, and butt welding an annular ring commonly to the peripheries of the flanges.

5. As an article of manufacture a hub comprising a barrel having a radial flange, the root of which is divided into two parts in a plane at right angles to the axis of the hub, and the outer portion of which is constituted by a ring welded in common to the divided root portion.

In testimony whereof he hereunto affixes his signature.

CAROLUS L. EKSERGIAN.